United States Patent
Gamage et al.

(10) Patent No.: US 10,544,354 B2
(45) Date of Patent: Jan. 28, 2020

(54) VISCOSIFIER FOR ENHANCED OIL RECOVERY

(71) Applicant: Halliburton Energy Services, Inc., Houston, TX (US)

(72) Inventors: Pubudu Hasanka Gamage, Katy, TX (US); Sandeep D. Kulkarni, Kingwood, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 44 days.

(21) Appl. No.: 15/030,712

(22) PCT Filed: Feb. 12, 2014

(86) PCT No.: PCT/US2014/016101
§ 371 (c)(1),
(2) Date: Apr. 20, 2016

(87) PCT Pub. No.: WO2015/122887
PCT Pub. Date: Aug. 20, 2015

(65) Prior Publication Data
US 2016/0251564 A1  Sep. 1, 2016

(51) Int. Cl.
*C09K 8/588* (2006.01)
*E21B 43/16* (2006.01)
(Continued)

(52) U.S. Cl.
CPC .............. *C09K 8/588* (2013.01); *C04B 24/163* (2013.01); *C04B 28/04* (2013.01); *C04B 28/06* (2013.01);
(Continued)

(58) Field of Classification Search
CPC .................................. C09K 8/588; E21B 43/16
(Continued)

(56) References Cited

U.S. PATENT DOCUMENTS 3,679,000 A   7/1972  Kaufman
4,246,124 A   1/1981  Swanson
(Continued)

FOREIGN PATENT DOCUMENTS

CA    2934848    8/2015
EP    0390282    10/1990
(Continued)

OTHER PUBLICATIONS

"International Application Serial No. PCT/US2014/016101, International Search Report dated Nov. 25, 2014", 3 pgs.
(Continued)

*Primary Examiner* — Aiqun Li
(74) *Attorney, Agent, or Firm* — Tenley Krueger; C. Tumey Law Group PLLC

(57) ABSTRACT

Various embodiments disclosed relate to methods, compositions, and systems for enhanced oil recovery including a viscosifier polymer. In various embodiments, the present invention provides a method of enhanced oil recovery that can include obtaining or providing a composition that includes a viscosifier polymer. The viscosifier polymer includes an ethylene repeating unit including a —$C(O)NH_2$ group and an ethylene repeating unit including an —$S(O)_2OR^1$ group, where the repeating units are in block, alternate, or random configuration. At each occurrence $R^1$ can be independently selected from the group consisting of —H and a counterion. The method can include placing the composition in a subterranean formation downhole via an injection wellbore. The method can also include extracting material comprising petroleum from the subterranean formation downhole via a production wellbore.

18 Claims, 3 Drawing Sheets

(51) Int. Cl.

| | |
|---|---|
| *C04B 28/14* | (2006.01) |
| *C04B 28/08* | (2006.01) |
| *C04B 28/04* | (2006.01) |
| *C04B 28/06* | (2006.01) |
| *C04B 24/16* | (2006.01) |
| *C09K 8/68* | (2006.01) |
| *C09K 8/584* | (2006.01) |
| *C09K 8/467* | (2006.01) |
| *C09K 8/528* | (2006.01) |
| *C09K 8/04* | (2006.01) |

(52) U.S. Cl.
CPC .............. *C04B 28/08* (2013.01); *C04B 28/14* (2013.01); *E21B 43/16* (2013.01); *C09K 8/04* (2013.01); *C09K 8/467* (2013.01); *C09K 8/528* (2013.01); *C09K 8/584* (2013.01); *C09K 8/68* (2013.01); *C09K 2208/08* (2013.01); *C09K 2208/24* (2013.01); *C09K 2208/26* (2013.01); *C09K 2208/32* (2013.01); *Y02W 30/92* (2015.05); *Y02W 30/94* (2015.05)

(58) Field of Classification Search
USPC ......................................... 507/226, 935, 936
See application file for complete search history.

(56) References Cited

U.S. PATENT DOCUMENTS

| | | | |
|---|---|---|---|
| 4,540,498 A * | 9/1985 | Wu .................. | C09K 8/588 166/275 |
| 4,702,319 A * | 10/1987 | Bock .................. | C09K 8/588 166/275 |
| 5,028,341 A | 7/1991 | Liao | |
| 5,147,964 A | 9/1992 | Huddleston et al. | |
| 2004/0152602 A1 | 8/2004 | Boles | |
| 2010/0004351 A1 | 1/2010 | Michaux et al. | |
| 2010/0311623 A1 | 12/2010 | Rey et al. | |
| 2010/0331510 A1 | 12/2010 | Reichenbach-Klinke et al. | |
| 2012/0006551 A1 | 1/2012 | Carman et al. | |
| 2012/0129734 A1 | 5/2012 | Reichenbach-Klinke et al. | |
| 2012/0132420 A1 | 5/2012 | Langlotz et al. | |
| 2012/0202958 A1 | 8/2012 | Liu et al. | |
| 2016/0083641 A1 | 3/2016 | Gamage | |

FOREIGN PATENT DOCUMENTS

| | | |
|---|---|---|
| IT | MI912371 | 3/1993 |
| IT | MI913157 | 5/1993 |
| IT | MI920699 | 9/1993 |
| IT | MI932646 | 6/1995 |
| WO | 2011092221 | 8/2011 |
| WO | WO-2015122887 A1 | 8/2015 |

OTHER PUBLICATIONS

"International Application Serial No. PCT/US2014/016101, Written Opinion dated Nov. 25, 2014", 9 pgs.

Clifford, P. J., et al., "The Effects of Chemical Degradation on Polymer Flooding", SPE 13586, SPE Oilfield and Geothermal Chemistry Symposium, held Mar. 9-11, 1985, Phoenix, AZ, (1985), 23 pgs.

Lake, L. W., "Chapter 47—Chemical Flooding", In: Petroleum Engineering Handbook, 47-1-47-26.

Tielong, C., et al., "A Pilot Test of Polymer Flooding in an Elevated-Temperature Reservoir", SPE Reservoir Evaluation & Engineering, (1998), 24-29.

Wang, D., et al., "Review of Practical Experience of Polymer Flooding at Daqing", SPE Reservoir Evaluation & Engineering, (2009), 470-476.

Australian Patent Examination Report No. 1 for Australian Application No. 2014382640 dated Oct. 27, 2016.

Non-Final Rejection for U.S. Appl. No. 15/030,647 dated Jan. 31, 2018.

Non-Final Rejection for U.S. Appl. No. 15/029,483 dated Mar. 29, 2018.

"Some Key Features to Consider when Studying Acrylamide-Based Polymers for Chemical Enhanced Oil Recovery" Thomas, A., Gaillard, N. and Favero C. Oil & Gas Science and Technology—Rev. IFP Energies Nouvelles, vol. 67 (6), 2012, pp. 887-902.

Klaus Weggen, Gunter Pusch, Heinrich Rischmuller, Oil & Gas, Ullmann's Encyclopedia of Industrial Chemistry; Wiley Online Library (Major Reference Works), First published Jun. 15, 2000.

"Acrylamide Polymers" Sun Yi Huang, David W Lipp, Ramond S Farinato, Kirk-Othmer Encyclopedia of Chemical Technology, Wiley Online Library, Major Reference Works, First Published: Aug. 17, 2001.

Australian request for reexamination for patent No. 2014382641 dated Apr. 24, 2018.

Canadian Examination Report for Application No. 2,934,455 dated Sep. 19, 2017.

Australian Re-examination Report for Application No. 2014382641 dated Nov. 26, 2018.

* cited by examiner

VISCOSIFIER FOR ENHANCED OIL RECOVERY

PRIORITY APPLICATIONS

This application is a U.S. National Stage Filing under 35 U.S.C. 371 from International Application No. PCT/US2014/016101, filed on Feb. 12, 2014, and published as WO 2015/122887 on Aug. 20, 2015, which application and published are incorporated herein by reference in their entirety.

BACKGROUND OF THE INVENTION

Generally only a portion of the petroleum in a reservoir can be produced by primary recovery methods, e.g., methods that rely on the energy in the formation for production. Secondary recovery methods such as water-flooding can result in further production, but large proportions of the original petroleum can remain in the reservoir even after application of primary and secondary methods. Enhanced oil recovery methods can substantially increase production beyond the yields obtained using primary and secondary recovery.

Enhanced oil recovery methods can include the injection of a viscosified aqueous solution through an injection wellbore and into the producing zone to sweep recoverable petroleum toward a production wellbore. However, high temperatures downhole or high concentrations of salt can cause viscosifiers in the aqueous solution to lose effectiveness, decreasing the viscosity of the aqueous solution. The lower viscosity of the aqueous solution can cause the interface between the aqueous solution and the remaining petroleum to experience "fingering," in which the aqueous solution passes by petroleum material, resulting in a less effective sweeping action and a bypassing of recoverable petroleum.

SUMMARY OF THE INVENTION

In various embodiments, the present invention provides a method of enhanced oil recovery. The method includes obtaining or providing a composition. The composition includes a viscosifier polymer including an ethylene repeating unit including a —C(O)NH$_2$ group and an ethylene repeating unit including an —S(O)$_2$OR$^1$ group, wherein the repeating units are in block, alternate, or random configuration. At each occurrence, R$^1$ is independently selected from the group consisting of —H and a counterion. The method includes placing the composition in a subterranean formation downhole via an injection wellbore. The method also includes extracting material including petroleum from the subterranean formation downhole via a production wellbore.

In various embodiments, the present invention provides a method of treating a subterranean formation. The method includes obtaining or providing a composition including a viscosifier polymer. The viscosifier polymer includes repeating units having the structure

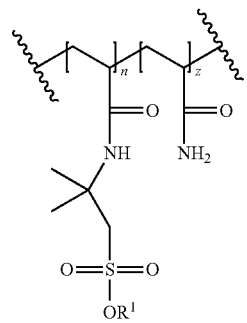

The repeating units are in block, alternate, or random configuration. At each occurrence, R$^1$ is independently selected from the group consisting of —H and a counterion. The viscosifier polymer has a molecular weight of about 5,000,000 g/mol to about 15,000,000 g/mol. The variable n is about 5,000 to about 75,000, and z is about 2,500 to about 170,000. The method includes placing the composition in a subterranean formation downhole via an injection wellbore. The method also includes extracting material including petroleum from the subterranean formation downhole via a production wellbore.

In various embodiments, the present invention provides a system for enhanced oil recovery. The system includes a composition including a viscosifier polymer having about Z$^1$ mol % of an ethylene repeating unit including a —C(O)NH$_2$ group and about N$^1$ mol % of an ethylene repeating unit including an —S(O)$_2$OR$^1$ group, wherein the repeating units are in block, alternate, or random configuration. At each occurrence, R$^1$ is independently selected from the group consisting of —H and a counterion. The variable Z$^1$ is about 10% to about 90%, and N$^1$ is about 10% to about 90%. The viscosifier polymer has a molecular weight of about 5,000,000 g/mol to about 15,000,000 g/mol. The system also includes a subterranean formation including the composition therein.

In various embodiments, the present invention provides a composition for enhanced oil recovery. The composition includes a viscosifier polymer having about Z$^1$ mol % of an ethylene repeating unit including a —C(O)NH$_2$ group and about N$^1$ mol % of an ethylene repeating unit including an —S(O)$_2$OR$^1$ group, wherein the repeating units are in block, alternate, or random configuration. At each occurrence, R$^1$ is independently selected from the group consisting of —H and a counterion. The variable Z$^1$ is about 10% to about 90%, and N$^1$ is about 10% to about 90%. The viscosifier polymer has a molecular weight of about 5,000,000 g/mol to about 15,000,000 g/mol.

In various embodiments, the present invention provides a method of preparing a composition for enhanced oil recovery. The method includes forming a composition including a viscosifier polymer having about Z$^1$ mol % of an ethylene repeating unit including a —C(O)NH$_2$ group and about N$^1$ mol % of an ethylene repeating unit including an —S(O)$_2$OR$^1$ group, wherein the repeating units are in block, alternate, or random configuration. At each occurrence, R$^1$ is independently selected from the group consisting of —H and a counterion. The variable Z$^1$ is about 10% to about 90%, and N$^1$ is about 10% to about 90%. The viscosifier polymer has a molecular weight of about 5,000,000 g/mol to about 15,000,000 g/mol.

Various embodiments of the present invention provide certain advantages over other methods, compositions, and systems for enhanced oil recovery, at least some of which are unexpected. For example, in some embodiments, the viscosifier polymer can provide a greater increase in viscosity of a composition for enhanced oil recovery per mass than other viscosifiers. Compared to the viscosity of an enhanced oil recovery fluid having a given concentration of a viscosifier, a corresponding enhanced oil recovery fluid having the same or lower concentration of various embodiments of the viscosifier polymer can have a higher viscosity. In some embodiments, by enabling a higher viscosity with the use of less viscosifier, the viscosifier polymer can provide lower transportation costs and shorter preparation time, making operations more efficient overall.

In various embodiments, the viscosifier polymer can be less expensive per unit mass as compared to conventional viscosifiers. In various embodiments, the viscosifier polymer can provide a greater viscosity increase per unit cost as compared to other viscosifiers. In various embodiments, the viscosifier polymer can provide a greater viscosity increase per unit cost in the presence of various salts or under high temperature conditions, as compared to other viscosifiers.

Many conventional viscosifiers suffer a decrease in the viscosity provided when used under high temperature conditions such as the conditions found downhole in many subterranean formations. In some embodiments, under high temperature conditions, the viscosifier polymer can provide a higher viscosity or can provide less or no decrease in viscosity as compared to the viscosity provided by other conventional viscosifiers under corresponding conditions. In various embodiments, the higher temperature stability of the viscosifier polymer can allow a desired level of viscosification with the use of less viscosifier, or can allow a higher viscosity to be achieved downhole, as compared to other conventional viscosifiers, thereby providing a more versatile, more cost effective, or more efficient viscosification downhole than other methods and compositions.

Many conventional viscosifiers suffer a decrease in the viscosity provided when used with liquids such as water having certain ions present at particular concentrations. For example, many viscosifiers suffer a decrease in the viscosity provided when used with liquids having certain amounts of salts dissolved therein such as sodium chloride or potassium chloride. In some embodiments, the viscosifier polymer can be used with liquids having ions dissolved therein and can suffer less or no negative effects from the ions, as compared to conventional methods and compositions for downhole use, such as less or no decrease in the viscosity provided. By being able to retain the viscosity provided or suffer less reduction in viscosity in the presence of various ions or in the presence of larger amounts of particular ions than other methods and compositions, various embodiments can avoid the need for ion-free or ion-depleted water, or can avoid a need to add greater amounts of viscosifier to achieve a desired effect downhole, and can thereby be more versatile, more cost effective, or more efficient than other methods and compositions for downhole use.

In various embodiments, as compared to other viscosifiers and compositions including the same, by providing a higher viscosity under high temperature conditions or high salinity conditions, the viscosifier polymer can provide a more effective enhanced oil recovery fluid under a wider variety of circumstances and using a wider variety of water sources, such as with less fingering and more efficient sweeping action of the recoverable petroleum, reducing overall cost of an enhanced oil recovery process. In various embodiments, as compared to other viscosifiers and compositions including the same, by providing a higher viscosity under high temperature conditions or high salinity conditions, the viscosifier polymer can provide improved fluid loss control.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
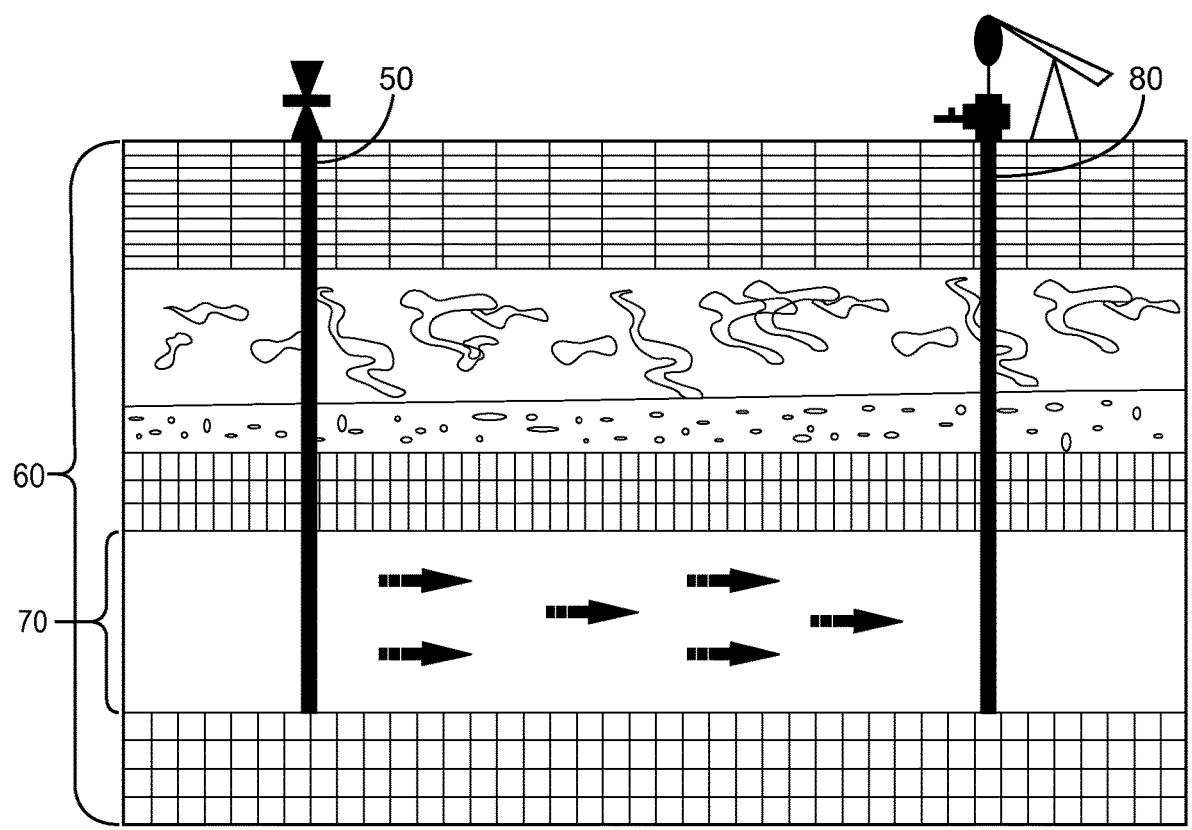
FIG. 1 illustrates an enhanced oil recovery method, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R), SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —CC(CH$_3$), —CC(CH$_2$CH$_3$), —CH$_2$C≡CH, —CH$_2$CC(CH$_3$), and —CH$_2$CC(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_a = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$ where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, "enhanced oil recovery" refers to an oil recovery enhancement method using techniques that alter the original properties of oil. The techniques employed during enhanced oil recovery can actually be initiated at any time during the productive life of an oil reservoir. It can at least one of restore formation pressure and improve oil displacement or fluid flow in the reservoir. Chemical flooding is a type of enhanced oil recovery. Enhanced oil recovery is also known as improved oil recovery or tertiary recovery and it is abbreviated as EOR.

As used herein, "chemical flooding" refers to an enhanced oil recovery method including at least one of 1) an aqueous solution including a viscosifier to sweep recoverable petroleum materials away from an injection site and toward a production site (e.g., a driving fluid or a mobility buffer) and 2) alkaline materials, surfactants, micelle solutions, or combinations thereof, to reduce the interfacial tension between oil and water and trigger an increase in oil production. In some embodiments, chemical flooding can include an optional preflush (e.g., an aqueous solution), an optional chemical solution (e.g., an aqueous solution of surfactant, alkaline materials, or a micelle solution), an optional mobility buffer, and a driving fluid (e.g., an aqueous solution), which displaces the chemicals and the resulting oil bank to production wells.

As used herein, "polymer flooding" refers to an enhanced oil recovery technique using water viscosified with soluble polymers. Viscosity can be increased until the mobility of the injectant is less than that of the recoverable petroleum, so the mobility ratio is less than unity. This condition can increase or maximize oil-recovery sweep efficiency, which can create a smooth flood front without less or no viscous fingering. Polymer flooding can also be applied to heterogeneous reservoirs; the viscous injectant can flow along high-permeability layers, decreasing the flow rates within them and enhancing sweep of zones with lower permeabilities.

As used herein, "alkaline flooding" refers to an enhanced oil recovery technique in which an alkaline chemical (e.g., sodium hydroxide, sodium orthosilicate, or sodium carbonate) is injected during polymer flooding or water flooding operations. The alkaline chemical reacts with certain types of oils, forming surfactants inside the reservoir. The formed surfactants can reduce the interfacial tension between recoverable petroleum and water and trigger an increase in petroleum production. Alkaline flooding is also known as caustic flooding.

As used herein, "micellar-polymer flooding" refers to an enhanced oil recovery technique in which a micelle solution is pumped into a reservoir through injection wellbores. The chemical solution can reduce the interfacial and capillary forces between oil and water and can trigger an increase in oil production.

As used herein, "alkaline-surfactant-polymer flooding" refers to an enhanced oil recovery method that uses two sources of surfactant. Alkaline chemicals (e.g., sodium hydroxide, sodium orthosilicate, or sodium carbonate) can react with various oil components to create a surfactant material. Also, a surfactant is injected. A water-soluble polymer is also injected, for example, as a slug following the mixture, in a mixture with the alkaline material and surfactant, or a combination thereof, thereby improving mobility control of the flood fronts.

As used herein, a "drive fluid" or "driving fluid" is a fluid used to displace recoverable petroleum material in the production zone away from an injection site and drive it toward a producing wellbore.

As used herein, a "mobility buffer" is a fluid stage including water thickened by a viscosifier that can be pumped between a chemical solution (e.g., micellar, alkaline, or surfactant) and a driving fluid. Mobility buffers can improve sweep efficiency, which can increase oil production. The high viscosity of the mobility buffer can aids in the displacement of chemicals into the reservoir and also can minimizes or reduce the channeling of the driving fluid into the chemical solution or into the resulting oil bank.

Method of Enhanced Oil Recovery.

In various embodiments, the present invention provides a method of enhanced oil recovery. The method includes obtaining or providing a composition including a viscosifier polymer comprising an ethylene repeating unit comprising a —C(O)NH$_2$ group and an ethylene repeating unit comprising an —S(O)$_2$OR$^1$ group, wherein the repeating units are in block, alternate, or random configuration. At each occurrence, R$^1$ is independently selected from the group consisting of —H and a counterion. The obtaining or providing of the composition can occur at any suitable time and at any suitable location. The obtaining or providing of the composition can occur above the surface. The obtaining or providing of the composition can occur downhole.

FIG. 1 illustrates an example embodiment of the present invention. The method can include placing the composition in a subterranean formation 60 downhole via an injection wellbore 50. The placing of the composition in the subterranean formation 60 can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a production zone 70 (e.g., a pay zone), a flow pathway, and an area surrounding a flow pathway. The method can include extracting material including petroleum from the subterranean formation 60 downhole via a production wellbore 80.

In various embodiments, the method can be a method of chemical flooding. The method can be a method of at least one of polymer flooding, alkaline polymer flooding, alkali-polymer-surfactant enhanced oil recovery, micellar polymer flooding, and surfactant polymer flooding. In some embodiments, the method is a method of alkali polymer enhanced oil recovery (e.g. alkaline polymer flooding). In some embodiments, the method is a method of alkali-polymer-surfactant enhanced oil recovery.

In some embodiments, the method further includes injecting a preflush in the injection wellbore prior to injection of the composition including the viscosifier polymer. The preflush can include water, such as low-salinity water. In some embodiments, the method can include injecting a mobility buffer in the injection wellbore. In some embodiments, the method can include injecting a drive fluid (e.g., driving fluid) into the injection wellbore.

The composition can form any suitable component or phase of the enhanced oil recovery method. In some examples, the composition is at least one of a drive fluid and a mobility buffer, or the composition is added to other materials such as an aqueous material to form a drive fluid or a mobility buffer. In other embodiments, the composition is at least one of a preflush or a chemical solution (e.g., including alkaline materials, surfactants, or micelles), or the composition is added to other materials such as an aqueous material to form a preflush or a chemical solution.

In some embodiments, in addition to the viscosifier polymer, the composition can include an aqueous liquid. The method can further include mixing the aqueous liquid with the polymer viscosifier. The mixing can occur at any suitable time and at any suitable location, such as above surface or downhole. The aqueous liquid can be any suitable aqueous liquid, such as at least one of water, brine, produced water, flowback water, brackish water, and sea water. In some embodiments, the aqueous liquid can include at least one of an aqueous drilling fluid and an aqueous fracturing fluid.

The composition can include any suitable proportion of the aqueous liquid, such that the composition can be used as described herein. For example, about 0.000.1 wt % to 99.999.9 wt % of the composition can be the aqueous liquid, or about 0.01 wt % to about 99.99 wt %, about 0.1 wt % to about 99.9 wt %, or about 20 wt % to about 90 wt %, or about 0.000.1 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999.9 wt % or more of the composition can be the aqueous liquid.

The aqueous liquid be a salt water. The salt can be any suitable salt, such as at least one of NaBr, CaCl$_2$, CaBr$_2$, ZnBr$_2$, KCl, NaCl, a magnesium salt, a bromide salt, a formate salt, an acetate salt, and a nitrate salt. The viscosifier polymer can effectively provide increased viscosity in aqueous solutions having various total dissolved solids levels, or having various ppm salt concentration. The viscosifier polymer can provide effective increased viscosity of a salt water having any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The viscosifier polymer can provide effective increased viscosity of a salt water having any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the aqueous liquid can have a concentration of at least one of NaBr, CaCl$_2$, CaBr$_2$, ZnBr$_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The composition can have any suitable viscosity above surface or downhole, such that the composition can be used as described herein. The viscosity can be affected by any suitable component, such as one or more viscosifier polymers, one or more crosslinked products of the one or more viscosifier polymers, one or more secondary viscosifiers, one or more secondary crosslinkers, one or more crosslinked products of a secondary viscosifier and a secondary crosslinker, or any combination thereof. In some embodiments, the viscosity of the composition, at standard temperature and pressure and at a shear rate of about 50 s$^{-1}$ to about 500 s$^{-1}$, is about 0.01 cP to about 1,000,000 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200,000, 225,000, 250, 000, 500,000, or about 1,000,000 cP or more. In some embodiments, the viscosity of the composition, at standard temperature and pressure and at a shear rate of about 0 s$^{-1}$ to about 1 s$^{-1}$, is about 0.01 cP to about 1,000,000 cP, or about 0.01 cP or less, or about 0.1 cP, 1, 2, 3, 4, 5, 10, 15, 20, 25, 50, 75, 100, 150, 200, 250, 500, 750, 1,000, 1,250, 1,500, 2,000, 2,500, 5,000, 10,000, 15,000, 20,000, 25,000, 50,000, 75,000, 100,000, 125,000, 150,000, 175,000, 200, 000, 225,000, 250,000, 500,000, or about 1,000,000 cP or more.

Viscosifier Polymer.

The composition includes at least one viscosifier polymer. The viscosifier polymer can include an ethylene repeating unit including the —C(O)NH$_2$ group and an ethylene repeating unit including the —S(O)$_2$R' group, wherein the repeating units are in block, alternate, or random configuration. At each occurrence, R$^1$ can be independently selected from the group consisting of —H and a suitable counterion.

Any suitable concentration of the viscosifier polymer can be present in the composition, such that the composition can be used as described herein. In some embodiments, about 0.001 wt % to about 100 wt % of the composition is the one or more viscosifier polymers, or about 0.01 wt % to about 50 wt %, about 30 wt % to about 95 wt %, or about 70 wt % to about 90 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 86, 87, 88, 89, 90, 91, 92, 93, 94, 95, 96, 97, 98, 99, 99.9, 99.99, or about 99.999 wt % or more of the composition is the one or more viscosifier polymers. In some examples, for a composition including the viscosifier polymer and an aqueous component, about 0.001 wt % to about 50 wt % of the composition is the one or more viscosifier polymers, or about 0.01 wt % to about 10 wt % of the composition, or about 0.001 wt % or less, or about 0.01 wt %, 0.1, 1, 2, 3, 4, 5, 10, 15, 20, 25, 30, 35, 40, 45, or about 50 wt % or more of the composition is the one or more viscosifier polymers.

In some embodiments, the viscosifier polymer can be sufficient such that at a concentration of about 500 ppm in water at about 100° C., standard pressure, and about 100 s$^{-1}$, a viscosity of about 5 cP to about 50 cP, about 6 cP to about 40 cP, about 7 cP to about 30 cP, about 8 cP to about 25 cP, about 10 cP to about 20 cP, or such that a viscosity of about 14 cP is provided. The viscosifier polymer can be sufficient such that at a concentration of about 500 ppm in water at about 25° C., standard pressure, and about 100 s$^{-1}$, a viscosity of about 5 cP to about 60 cP, about 6 cP to about 50 cP, about 7 cP to about 35 cP, about 8 cP to about 30 cP, about 15 cP to about 25 cP, or such that a viscosity of about 21 cP is provided. The viscosifier polymer can be sufficient such that at a concentration of about 2500 ppm in water at about 100° C., standard pressure, and about 100 s$^{-1}$, a viscosity of about 10 cP to about 150 cP, about 15 cP to about 100 cP, about 20 cP to about 80 cP, about 30 cP to about 60 cP, about 40 cP to about 50 cP, or such that a viscosity of about 46 cP is provided. The viscosifier polymer can be sufficient such that at a concentration of about 2500 ppm in water at about 25° C., standard pressure, and about 100 s$^{-1}$, a viscosity of about 20 cP to about 200 cP, about 30 cP to about 150 cP, about 40 cP to about 100 cP, 50 cP to about 30 cP, 65 cP to about 75 cP, or such that a viscosity of about 68 cP is provided. The viscosifier polymer can be sufficient such that, as compared to the viscosity provided at a concentration in water at about 25° C. at standard pressure and 100 s$^{-1}$, the viscosity provided at the same concentration in water at about 100° C. at standard pressure and 100 s$^{-1}$ is no more than about 30% to about 50% lower, no more than about 40% lower, or no more than about 0% lower, 1% lower or less, 2%, 3, 4, 5, 6, 8, 10, 12, 14, 16, 18, 20, 22, 24, 26, 28, 30, 32, 34, 36, 38, or no more than about 40% lower or more.

The viscosifier polymer can have about Z$^1$ mol % of the ethylene repeating unit including the —C(O)NH$_2$ group, wherein Z$^1$ is any suitable mol %, such as about 10% to about 90%, or about 30% to about 50%, or about 10% or less, or about 15%, 20, 22, 24, 26, 28, 30, 32, 34, 36, 38, 40, 42, 44, 46, 48, 50, 52, 54, 56, 58, 60, 62, 64, 68, 68, 70, 75, 80, 85, or about 90% or more. The viscosifier polymer can have about N$^1$ mol % of the ethylene repeating unit including the —S(O)$_2$R' group, wherein N$^1$ is any suitable mol %, such as is about 10% to about 90%, or about 30% to about 50%, or about 10% or less, or about 15%, 20, 22, 24, 26, 28, 30, 32, 34, 36, 38, 40, 42, 44, 46, 48, 50, 52, 54, 56, 58, 60, 62, 64, 68, 68, 70, 75, 80, 85, or about 90% or more. In some embodiments, Z$^1$+N$^1$ can be about 100%.

The viscosifier polymer can have any suitable molecular weight, such as about 5,000,000 g/mol to about 15,000,000 g/mol, about 7,000,000 g/mol to about 10,000,000 g/mol, or about 5,000,000 g/mol or less, or about 5,500,000 g/mol, 6,000,000, 6,500,000, 7,000,000, 7,500,000, 8,000,000, 8,500,000, 9,000,000, 9,500,000, 10,000,000, 10,500,000, 11,000,000, 11,500,000, 12,000,000, 12,500,000, 13,000,000, 13,500,000, 14,000,000, 14,500,000, or about 15,000,000 g/mol or more.

In some embodiments, the viscosifier polymer can include repeating units having the structure:

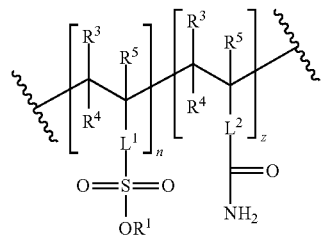

The repeating units are in a block, alternate, or random configuration, and each repeating unit is independently in the orientation shown or in the opposite orientation.

At each occurrence, R$^1$ can be independently selected from the group consisting of —H and a suitable counterion. In some embodiments, at each occurrence, —R' is independently selected from the group consisting of —H, Na$^+$, K$^+$, Li$^+$, NH$_4^+$, Zn$^+$, Ca$^{2+}$, Zn$^{2+}$, Al$^{3+}$, and Mg$^{2+}$. In some embodiments, at each occurrence, —R' is —H.

At each occurrence, R$^3$, R$^4$, and R$^5$ can be independently selected from the group consisting of —H and a substituted or unsubstituted C$_1$-C$_5$ hydrocarbyl. At each occurrence, R$^3$, R$^4$, and R$^5$ can be independently selected from the group consisting of —H and a C$_1$-C$_5$ alkyl. At each occurrence, R$^3$, R$^4$, and R$^5$ can be independently selected from the group consisting of —H and a C$_1$-C$_3$ alkyl. In some embodiments, at each occurrence, R$^3$, R$^4$, and R$^5$ are each —H.

At each occurrence, L$^1$ and L$^2$ can be independently selected from the group consisting of a bond and a substituted or unsubstituted C$_1$-C$_{40}$ hydrocarbyl interrupted or terminated with 0, 1, 2, or 3 of at least one of —NR$^3$—, —S—, and —O—. At each occurrence, L$^1$ can be independently selected from the group consisting of a bond, L$^2$, and -(substituted or unsubstituted C$_1$-C$_{20}$ hydrocarbyl)-NR$^3$-(substituted or unsubstituted C$_1$-C$_{20}$ hydrocarbyl)-. At each occurrence, L$^1$ can be independently —C(O)—NH-(substituted or unsubstituted C$_1$-C$_{20}$ hydrocarbyl)-. At each occurrence, L$^1$ can be independently —C(O)—NH—(C$_1$-C$_5$ hydrocarbyl)-. In some embodiments, L$^1$ can be —C(O)—NH—CH(CH$_3$)$_2$—CH$_2$—. At each occurrence, L$^2$ can be independently selected from the group consisting of a bond and C$_1$-C$_{20}$ hydrocarbyl. At each occurrence, L$^2$ can be independently selected from the group consisting of a bond and C$_1$-C$_5$ alkyl. In some embodiments, at each occurrence, L$^2$ can be a bond.

The variable n can have any suitable value consistent with N$^1$, the molecular weight of the viscosifier polymer, and the molecular weight of the repeating unit including the —S(O)$_2$R$^1$ group. In some embodiments, n can be about 5,000 to about 75,000, or about 20,000 to about 45,000, or about 5,000 or less, or about 7,500, 10,000, 12,500, 15,000, 17,500, 20,000, 22,500, 25,000, 27,500, 30,000, 32,500, 35,000, 37,500, 40,000, 42,500, 45,000, 47,500, 50,000, 52,500, 55,000, 57,500, 60,000, 62,500, 65,000, 67,500, 70,000, 72,500, or about 75,000 or more. The variable z can have any suitable value consistent with Z$^1$, the molecular weight of the viscosifier polymer, and the molecular weight of the repeating unit including the —C(O)NH$_2$ group. In some embodiments, z is about 2,500 to about 170,000, or about 13,500 to about 65,000, or about 2,500 or less, 5,000, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 105,000, 110,000, 115,000, 120,000, 125,000, 130,000, 135,000, 140,000, 145, 000, 150,000, 155,000, 160,000, 165,000, or about 170,000 or more.

In some embodiments, the viscosifier polymer includes repeating units having the structure:

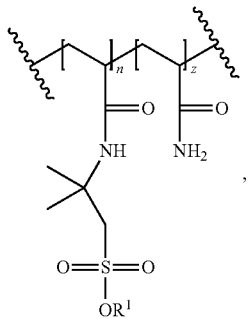

The repeating units are in a block, alternate, or random configuration, and each repeating unit is independently in the orientation shown or in the opposite orientation.

Surfactant, Micelles, and Alkaline Material.

In some embodiments, the composition can include one or more surfactants. The surfactant can be any suitable surfactant, such that the composition can be used as described herein. The surfactant can be a cationic surfactant, an anionic surfactant, or a non-ionic surfactant. In some embodiments, the surfactant can be chosen from cetyltrimethylammonium bromide, a branched alkyl sulfonate, decaethylene glycol oleyl ether, diethylene glycol oleyl ether, polyethylene glycol dodecyl ether, polyethylene glycol hexadecyl ether, a polyethylene glycol stearyl ether, an ethoxylated nonyl phenol phosphate ester, and a C$_{12}$-C$_{22}$ alkyl phosphonate. In some embodiments, about 0.01 wt % to about 50 wt % of the composition is the surfactant, or about 0.1 wt % to about 10 wt %, or about 0.01 wt % or less, or about 0.1 wt %, 1, 2, 3, 4, 5, 6, 8, 10, 12, 14, 16, 18, 20, 22, 24, 26, 28, 30, 32, 34, 36, 38, 40, 42, 44, 46, 48, or about 50 wt % or more of the composition is the one or more surfactants.

In one example, the surfactant is sorbitan monooletate. In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monooleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant.

Examples of suitable cationic surfactants can include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

Examples of suitable anionic surfactants can include alkyl sulphates such as lauryl sulphate, polymers such as acrylates/C$_{10\text{-}30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of suitable non-ionic surfactants can include condensates of ethylene oxide with long chain fatty alcohols or fatty acids such as a (C$_{12\text{-}16}$)alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols.

In some embodiments, the surfactant can be selected from Tergitol™ 15-s-3, Tergitol™ 15-s-40, sorbitan monooleate, polylycol-modified trimethsilylated silicate, polyglycol-modified siloxanes, polyglycol-modified silicas, ethoxylated quaternary ammonium salt solutions, and cetyltrimethylammonium chloride solutions.

In some embodiments, the composition can further include micelles. Any suitable proportion of the composition can be micelles, such as about 0.01 wt % to about 50 wt % of the composition is the surfactant, or about 0.1 wt % to about 10 wt %, or about 0.01 wt % or less, or about 0.1 wt %, 1, 2, 3, 4, 5, 6, 8, 10, 12, 14, 16, 18, 20, 22, 24, 26, 28, 30, 32, 34, 36, 38, 40, 42, 44, 46, 48, or about 50 wt % or more of the composition. In some embodiment, the micelles include at least one surfactant, such as any surfactant described herein.

In various embodiments, the composition further includes one or more alkaline materials. The alkaline material can be any suitable alkaline material, such that the composition can react with various components of petroleum downhole to produce soap-like or surfactant molecules. In some examples, the alkaline material catalyzes hydrolysis of long-chain fatty esters to generate long-chain fatty acids that can act as soaps or surfactants. In some examples, the alkaline material can include at least one of sodium hydroxide, potassium hydroxide, ammonium hydroxide, hydroxyl amine, sodium orthosilicate, potassium orthosilicate, sodium carbonate, potassium carbonate, and an organic base. The composition can include any suitable proportion of the one or more alkaline materials, such as about 0.01 wt % to 99.99 wt %, about 0.1 wt % to about 50 wt %, or about 0.1 wt % to about 20 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, 99.9, 99.99 wt % or more of the composition.

Other Components.

In various embodiments, the composition including the viscosifier polymer can further include one or more suitable additional components. The additional components can be any suitable additional components, such that the composition can be used as described herein.

The composition can further include one or more fluids. The composition can include a fluid including at least one of water, an organic solvent, and an oil. The composition can include a fluid including at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone. The composition can further include at least one of water, brine, produced water, flowback water, brackish water, and sea water. The composition can include any suitable proportion of the one or more fluids, such as about 0.001 wt % to 99.999 wt %, about 0.01 wt % to about 99.99 wt %, about 0.1 wt % to about 99.9 wt %, or about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, or about 99.999 wt % or more of the composition.

The composition can further include a secondary viscosifier, in addition to the viscosifier polymer. The secondary viscosifier can be present in any suitable concentration, such as more, less, or an equal concentration as compared to the concentration of the viscosifier polymer. The secondary viscosifier can include at least one of a substituted or unsubstituted polysaccharide, and a substituted or unsubstituted polyalkenylene, wherein the substituted or unsubstituted polysaccharide or polyalkenylene is crosslinked or uncrosslinked. The secondary viscosifier can include a polymer including at least one monomer selected from the group consisting of ethylene glycol, acrylamide, vinyl acetate, 2-acrylamidomethylpropane sulfonic acid or its salts, trimethylammoniummethyl acrylate halide, and trimethylammoniumethyl methacrylate halide. The secondary viscosifier can include a crosslinked gel or a crosslinkable gel.

The secondary viscosifier can affect the viscosity of the composition at any suitable time and location. In some embodiments, the secondary viscosifier provides an increased viscosity at least one of before placement in the subterranean formation, at the time of placement into the subterranean formation, during travel downhole, once the composition reaches a particular downhole location, or some period of time after the composition reaches a particular location downhole. In some embodiments, the secondary viscosifier can provide some or no increased viscosity until the secondary viscosifier reaches a desired location downhole, at which point the secondary viscosifier can provide a small or large increase in viscosity.

In some embodiments, the secondary viscosifier includes at least one of a linear polysaccharide, and poly(($C_2$-$C_{10}$)alkenylene), wherein at each occurrence, the ($C_2$-$C_{10}$)alkenylene is independently substituted or unsubstituted. In some embodiments, the secondary viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxylpropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxyl ethyl cellulose).

In some embodiments, the secondary viscosifier can include a poly(vinyl alcohol) homopolymer, poly(vinyl alcohol) copolymer, a crosslinked poly(vinyl alcohol) homopolymer, and a crosslinked poly(vinyl alcohol) copolymer. The secondary viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The secondary viscosifier can include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2-methylpropanesulfonic acid) copolymer, or a poly(vinylalcohol)-poly(N-vinylpyrrolidone) copolymer. The secondary viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The secondary viscosifier can include a crosslinked poly (vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin. The composition can include any suitable proportion of the secondary viscosifier, such as about 0.001 wt % to 99.999 wt %, about 0.01 wt % to about 99.99 wt %, about 0.1 wt % to about 50 wt %, or about 0.1 wt % to about 20 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, or about 99.999 wt % or more of the composition.

The composition can further include a crosslinker. The crosslinker can be any suitable crosslinker. In various embodiments, the crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. The composition can include any suitable proportion of the crosslinker, such as about 0.000.1 wt % to 99.999.9 wt %, about 0.01 wt % to about 99.99 wt %, about 0.1 wt % to about 50 wt %, or about 0.1 wt % to about 20 wt %, or about 0.000.1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, or about 99.999.9 wt % or more of the composition.

In some embodiments, the composition can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a HTHP filtration control agent including a crosslinked copolymer; DURA-TONE® HT, a filtration control agent that includes an organophilic lignite, more particularly organophilic leonardite; THERMO TONE™, a high temperature high pressure (HTHP) filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARAC-ARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition can include any optional component listed in this paragraph, such as about 0.000.1 wt % to 99.999.9 wt %, 0.01 wt % to about 99.99 wt %, 0.1 wt % to 99.9 wt %, or about 20 wt % to about 90 wt %, or about 0.000.1 wt % or less, or about 0.001 wt %, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, or about 99.999.9 wt % or more of the composition.
System or Apparatus.

In various embodiments, the present invention provides a system. The system can be any suitable system that includes the use of the viscosifier polymer described herein in a subterranean formation for enhanced oil recovery. The system can include a composition including an embodiment of the viscosifier polymer described herein. The system can also include a subterranean formation including the composition therein. In some embodiments, the system further includes a tubular disposed in an injection wellbore, and a pump configured to pump the composition downhole, such that the composition sweeps receeoverable petroleum away from the injection site and toward a producing wellbore.

In various embodiments, the present invention provides an apparatus. The apparatus can be any suitable apparatus that can be used to perform an embodiment of the method for enhanced oil recovery described herein.

Various embodiments provide systems and apparatus configured for delivering the composition described herein to a downhole location and for using the composition therein for enhanced oil recovery. In various embodiments, the systems can include a pump fluidly coupled to a tubular (e.g., any suitable type of oilfield pipe, such as pipeline, drill pipe, production tubing, and the like), the tubular containing a composition including the viscosifier polymer described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

Figure 3:
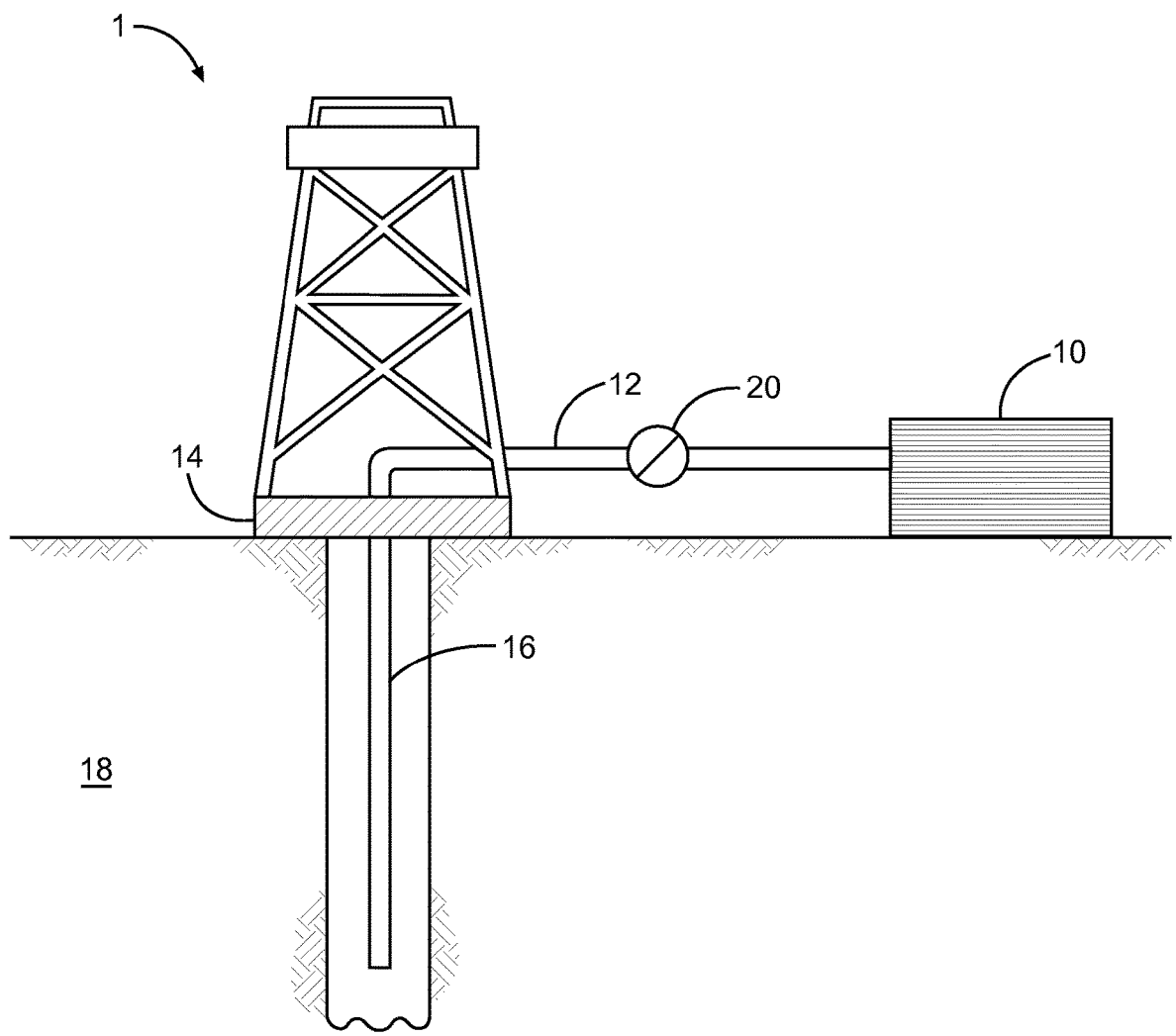
FIG. 3 illustrates a system or apparatus for delivering a composition downhole, in accordance with various embodiments.

FIG. 3 shows an illustrative schematic of systems and apparatuses that can deliver embodiments of the compositions of the present invention to a downhole location, according to one or more embodiments. It should be noted that while FIG. 3 generally depicts a land-based system or apparatus, it is to be recognized that like systems and apparatuses can be operated in subsea locations as well. Embodiments of the present invention can have a different scale than that depicted in FIG. 3. As depicted in FIG. 3, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 3 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 3.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can be any composition for enhanced oil recovery that includes an embodiment of the viscosifier polymer described herein.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including any embodiment of the viscosifier polymer described herein.

EXAMPLES

Various embodiments of the present invention can be better understood by reference to the following Examples which are offered by way of illustration. The present invention is not limited to the Examples given herein.

Example 1

Preparation of Samples

Three different polymer solutions (2500 ppm (parts per million), 1000 ppm and 500 ppm) were prepared by dissolving in deionized water an acrylamide/acrylamido-2-methyl-propanesulfonic acid polymer (having about 50 wt % acrylamide-derived monomers, about 50 wt % acrylamido-2-methyl-propanesulfonic acid-derived monomers, and a molecular weight of about 8,000,000 g/mol).

Example 2

Viscosity Measurements

Figure 2:
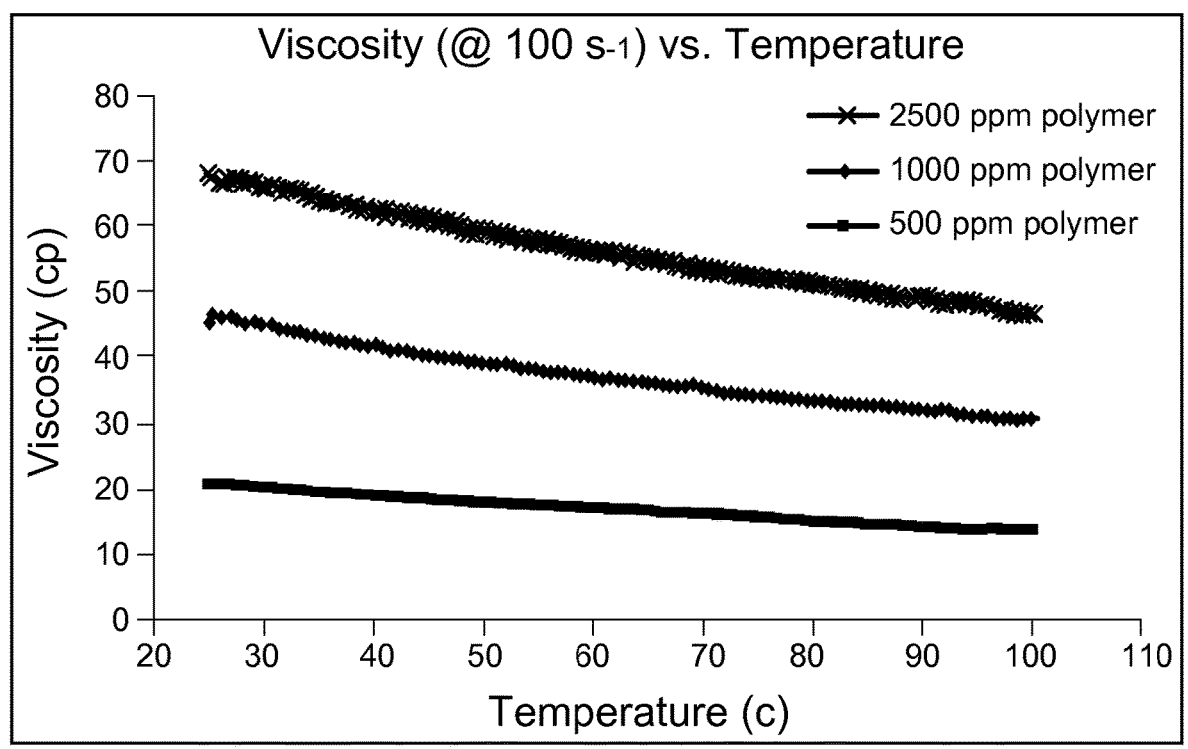
FIG. 2 illustrates viscosity vs. temperature for fluids with different polymer concentrations, according to various embodiments.

Viscosity of the polymer solutions were measured using an advanced Rheometer (Anton Paar) at different temperatures ranging from 25° C. to 100° C. at 100 s$^{-1}$ and standard pressure, with the results illustrated in FIG. 2 and Table 1.

TABLE 1

Viscosity of polymer solutions at different temperatures

| Polymer concentration | Viscosity at 25° C. (cP) | Viscosity at 50° C. (cP) | Viscosity at 75° C. (cP) | Viscosity at 100° C. (cP) |
|---|---|---|---|---|
| 500 ppm | 20.7 | 17.9 | 15.6 | 13.7 |
| 1000 ppm | 45.1 | 39 | 34.1 | 30.5 |
| 2500 ppm | 67.9 | 58.9 | 51.7 | 46.2 |
| 0 ppm (water) | 0.9 | 0.54 | 0.38 | 0.28 |

The data shows that viscosity of these polymer solutions remains stable with increasing temperature; the decrease in viscosity is less than 40% when the temperature increased from 25° C. to 100° C. Measured polymer solution viscosity values can be compared with the water viscosity to access the mobility reduction of polymer solutions at different temperatures as shown in Table 1. Even at 500 ppm polymer concentration about 20 cP viscosity was observed.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of enhanced oil recovery, the method comprising:
 obtaining or providing a composition comprising
  a viscosifier polymer comprising an ethylene repeating unit comprising a —C(O)NH$_2$ group and an ethylene repeating unit comprising an —S(O)$_2$OR$^1$ group, wherein
   at each occurrence R$^1$ is independently selected from the group consisting of —H and a counterion, and
   the repeating units are in block, alternate, or random configuration;
 placing the composition in a subterranean formation downhole via an injection wellbore; and
 extracting material comprising petroleum from the subterranean formation downhole via a production wellbore.

Embodiment 2 provides the method of Embodiment 1, wherein the method is a method of chemical flooding.

Embodiment 3 provides the method of any one of Embodiments 1-2, wherein the method is a method of at least one of polymer flooding, alkaline polymer flooding, alkali-polymer-surfactant enhanced oil recovery, micellar polymer flooding, and surfactant polymer flooding.

Embodiment 4 provides the method of any one of Embodiments 1-3, wherein the method is a method of alkali polymer enhanced oil recovery.

Embodiment 5 provides the method of any one of Embodiments 1-4, wherein the method is a method of alkali-polymer-surfactant enhanced oil recovery.

Embodiment 6 provides the method of any one of Embodiments 1-5, wherein the placing of the composition in the subterranean formation downhole comprises placing the composition in a producing zone downhole, and wherein the extracting of the material comprising petroleum from the subterranean formation downhole comprises extracting of the material from the producing zone.

Embodiment 7 provides the method of any one of Embodiments 1-6, wherein the composition includes an aqueous liquid.

Embodiment 8 provides the method of Embodiment 7, wherein the method further comprises mixing the aqueous liquid with the polymer viscosifier.

Embodiment 9 provides the method of Embodiment 8, wherein the mixing occurs above surface.

Embodiment 10 provides the method of any one of Embodiments 8-9, wherein the mixing occurs downhole.

Embodiment 11 provides the method of any one of Embodiments 7-10, wherein the aqueous liquid comprises at least one of water, brine, produced water, flowback water, brackish water, and sea water.

Embodiment 12 provides the method of any one of Embodiments 7-11, wherein the aqueous liquid comprises salt water having a total dissolved solids level of about 1,000 mg/L to about 250,000 mg/L.

Embodiment 13 provides the method of any one of Embodiments 7-12, wherein the salt water has a total dissolved solids level of at least about 25,000 mg/L.

Embodiment 14 provides the method of any one of Embodiments 7-13, wherein the aqueous liquid comprises at least one of an aqueous drilling fluid and an aqueous fracturing fluid.

Embodiment 15 provides the method of any one of Embodiments 1-14, wherein about 0.001 wt % to about 100 wt % of the composition is the viscosifier polymer.

Embodiment 16 provides the method of any one of Embodiments 1-15, wherein about 0.01 wt % to about 50 wt % of the composition is the viscosifier polymer.

Embodiment 17 provides the method of any one of Embodiments 7-16, wherein about 0.01 wt % about 10 wt % of the composition is the viscosifier polymer.

Embodiment 18 provides the method of any one of Embodiments 1-17, wherein the viscosity of the composition, at standard temperature and pressure and at a shear rate of about $50\ s^{-1}$ to about $500\ s^{-1}$, is about 0.01 cP to about 1,000,000 cP.

Embodiment 19 provides the method of any one of Embodiments 1-18 wherein the viscosity of the composition, at standard temperature and pressure and at a shear rate of about $0\ s^{-1}$ to about $1\ s^{-1}$, is about 0.01 cP to about 1,000,000 cP.

Embodiment 20 provides the method of any one of Embodiments 1-19, wherein the viscosifier polymer is sufficient such that at a concentration of about 500 ppm in water at about 100° C., standard pressure, and about $100\ s^{-1}$, a viscosity of about 14 cP is provided.

Embodiment 21 provides the method of any one of Embodiments 1-20, wherein the viscosifier polymer is sufficient such that at a concentration of about 500 ppm in water at about 25° C., standard pressure, and about $100\ s^{-1}$, a viscosity of about 21 cP is provided.

Embodiment 22 provides the method of any one of Embodiments 1-21, wherein the viscosifier polymer is sufficient such that at a concentration of about 2500 ppm in water at about 100° C., standard pressure, and about $100\ s^{-1}$, a viscosity of about 46 cP is provided.

Embodiment 23 provides the method of any one of Embodiments 1-22, wherein the viscosifier polymer is sufficient such that at a concentration of about 2500 ppm in water at about 25° C., standard pressure, and about $100\ s^{-1}$, a viscosity of about 68 cP is provided.

Embodiment 24 provides the method of any one of Embodiments 1-23, wherein the viscosifier polymer is sufficient such that, as compared to the viscosity provided at a concentration in water at about 25° C. at standard pressure and $100\ s^{-1}$, the viscosity provided at the same concentration in water at about 100° C. at standard pressure and $100\ s^{-1}$ is no more than about 30% to about 50% lower.

Embodiment 25 provides the method of any one of Embodiments 1-24, wherein the viscosifier polymer is sufficient such that, as compared to the viscosity provided at a concentration in water at about 25° C. at standard pressure and $100\ s^{-1}$, the viscosity provided at the same concentration in water at about 100° C. at standard pressure and $100\ s^{-1}$ is no more than about 40% lower.

Embodiment 26 provides the method of any one of Embodiments 1-25, wherein the viscosifier polymer has about $Z^1$ mol % of the ethylene repeating unit comprising the —C(O)NH$_2$ group and has about $N^1$ mol % of the ethylene repeating unit comprising the —S(O)$_2$R' group, wherein $Z^1$ is about 10% to about 90%, and $N^1$ is about 10% to about 90%.

Embodiment 27 provides the method of Embodiment 26, wherein $Z^1+N^1$ is about 100%.

Embodiment 28 provides the method of any one of Embodiments 1-27, wherein $Z^1$ is about 30% to about 50%, and $N^1$ is about 30% to about 50%.

Embodiment 29 provides the method of any one of Embodiments 1-28, wherein the viscosifier polymer has a molecular weight of about 5,000,000 g/mol to about 15,000,000 g/mol.

Embodiment 30 provides the method of any one of Embodiments 1-29, wherein the viscosifier polymer as a molecular weight of about 7,000,000 g/mol to about 9,000,000 g/mol.

Embodiment 31 provides the method of any one of Embodiments 1-30, wherein the viscosifier polymer comprises repeating units having the structure

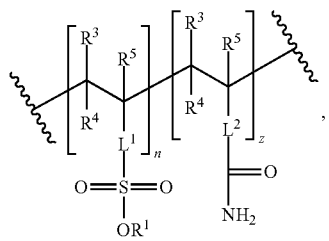

wherein
at each occurrence $R^3$, $R^4$, and $R^5$ are independently selected from the group consisting of —H and a substituted or unsubstituted $C_1$-$C_5$ hydrocarbyl,
at each occurrence $L^1$ and $L^2$ are independently selected from the group consisting of a bond and a substituted or unsubstituted $C_1$-$C_{40}$ hydrocarbyl interrupted or terminated with 0, 1, 2, or 3 of at least one of —NR$^3$—, —S—, and —O—,
the repeating units are in a block, alternate, or random configuration, and each repeating unit is independently in the orientation shown or in the opposite orientation.

Embodiment 32 provides the method of Embodiment 31, wherein at each occurrence $L^1$ is independently selected from the group consisting of a bond, L2, and -(substituted or unsubstituted $C_1$-$C_{20}$ hydrocarbyl)-NR$^3$-(substituted or unsubstituted $C_1$-$C_{20}$ hydrocarbyl)-.

Embodiment 33 provides the method of any one of Embodiments 31-32, wherein at each occurrence $L^1$ is independently —C(O)—NH-(substituted or unsubstituted $C_1$-$C_{20}$ hydrocarbyl)-.

Embodiment 34 provides the method of any one of Embodiments 31-33, wherein at each occurrence $L^1$ is independently —C(O)—NH—($C_1$-$C_5$ hydrocarbyl)-.

Embodiment 35 provides the method of any one of Embodiments 31-34, wherein $L^1$ is —C(O)—NH—CH(CH$_3$)$_2$—CH$_2$—.

Embodiment 36 provides the method of any one of Embodiments 31-35, wherein at each occurrence $L^2$ is independently selected from the group consisting of a bond and $C_1$-$C_{20}$ hydrocarbyl.

Embodiment 37 provides the method of any one of Embodiments 31-36, wherein at each occurrence $L^2$ is independently selected from the group consisting of a bond and $C_1$-$C_5$ alkyl.

Embodiment 38 provides the method of any one of Embodiments 31-37, wherein at each occurrence $L^2$ is a bond.

Embodiment 39 provides the method of any one of Embodiments 31-38, wherein at each occurrence $R^3$, $R^4$, and $R^5$ are independently selected from the group consisting of —H and a $C_1$-$C_5$ alkyl.

Embodiment 40 provides the method of any one of Embodiments 31-39, wherein at each occurrence $R^3$, $R^4$, and $R^5$ are independently selected from the group consisting of —H and a $C_1$-$C_3$ alkyl.

Embodiment 41 provides the method of any one of Embodiments 31-40, wherein at each occurrence $R^3$, $R^4$, and $R^5$ are each —H.

Embodiment 42 provides the method of any one of Embodiments 31-41, wherein at each occurrence —R' is independently selected from the group consisting of —H, $Na^+$, $K^+$, $Li^+$, $NH_4^+$, $Zn^+$, $Ca^{2+}$, $Zn^{2+}$, $Al^{3+}$, and $Mg^{2+}$.

Embodiment 43 provides the method of any one of Embodiments 31-42, wherein at each occurrence —R' is —H.

Embodiment 44 provides the method of any one of Embodiments 31-43, wherein n is about 5,000 to about 75,000.

Embodiment 45 provides the method of any one of Embodiments 31-44, wherein n is about 20,000 to about 45,000.

Embodiment 46 provides the method of any one of Embodiments 31-45, wherein z is about 2,500 to about 170,000.

Embodiment 47 provides the method of any one of Embodiments 31-46, wherein z is about 13,500 to about 65,000.

Embodiment 48 provides the method of any one of Embodiments 1-47, wherein the viscosifier polymer comprises repeating units having the structure

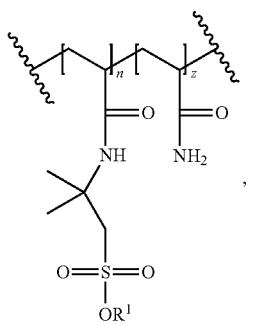

wherein
the repeating units are in a block, alternate, or random configuration, and each repeating unit is independently in the orientation shown or in the opposite orientation.

Embodiment 49 provides the method of any one of Embodiments 1-48, wherein the composition further comprises a fluid comprising at least one of water, an organic solvent, and an oil.

Embodiment 50 provides the method of any one of Embodiments 1-49, wherein the composition further comprises a surfactant.

Embodiment 51 provides the method of Embodiment 50, wherein the surfactant comprises a cationic surfactant, an anionic surfactant, or a non-ionic surfactant.

Embodiment 52 provides the method of any one of Embodiments 50-51, wherein the surfactant is chosen from cetyltrimethylammonium bromide, a branched alkyl sulfonate, decaethylene glycol oleyl ether, diethylene glycol oleyl ether, polyethylene glycol dodecyl ether, polyethylene glycol hexadecyl ether, a polyethylene glycol stearyl ether, an ethoxylated nonyl phenol phosphate ester, and a $C_{12}$-$C_{22}$ alkyl phosphonate.

Embodiment 53 provides the method of any one of Embodiments 50-52, wherein about 0.01 wt % to about 50 wt % of the composition is the surfactant.

Embodiment 54 provides the method of any one of Embodiments 50-53, wherein about 0.1 wt % to about 10 wt % of the composition is the surfactant.

Embodiment 55 provides the method of any one of Embodiments 50-54, wherein at least some of the surfactant is in the form of micelles.

Embodiment 56 provides the method of any one of Embodiments 1-55, wherein the composition further comprises micelles.

Embodiment 57 provides the method of any one of Embodiments 1-56, wherein the composition further comprises an alkaline material.

Embodiment 58 provides the method of any one of Embodiments 1-57, wherein the alkaline material comprises at least one of sodium hydroxide, potassium hydroxide, ammonium hydroxide, hydroxyl amine, sodium orthosilicate, potassium orthosilicate, sodium carbonate, potassium carbonate, and an organic base.

Embodiment 59 provides the method of any one of Embodiments 1-58, wherein the method further comprises injecting a preflush in the injection wellbore prior to injection of the composition comprising the viscosifier polymer.

Embodiment 60 provides the method of Embodiment 59 wherein the preflush comprises water.

Embodiment 61 provides the method of any one of Embodiments 1-60, wherein the method further comprises injecting a mobility buffer in the injection wellbore.

Embodiment 62 provides the method of any one of Embodiments 1-61, wherein the composition is a mobility buffer.

Embodiment 63 provides the method of any one of Embodiments 1-62, wherein the method further comprises injecting a drive fluid into the injection wellbore.

Embodiment 64 provides the method of any one of Embodiments 1-63, wherein the composition is a drive fluid.

Embodiment 65 provides the method of any one of Embodiments 1-64, wherein the composition further comprises a fluid comprising at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon comprising an internal olefin, a hydrocarbon comprising an alpha olefin, xylenes, an ionic liquid, methyl ethyl ketone, and cyclohexanone.

Embodiment 66 provides the method of any one of Embodiments 1-65, wherein the composition further comprises a secondary viscosifier.

Embodiment 67 provides the method of Embodiment 66, wherein the secondary viscosifier comprises at least one of a substituted or unsubstituted polysaccharide, and a substituted or unsubstituted polyalkenylene, wherein the substituted or unsubstituted polysaccharide or polyalkenylene is crosslinked or uncrosslinked.

Embodiment 68 provides the method of any one of Embodiments 66-67, wherein the secondary viscosifier comprises a polymer comprising at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

Embodiment 69 provides the method of any one of Embodiments 66-68, wherein the secondary viscosifier comprises a crosslinked gel or a crosslinkable gel.

Embodiment 70 provides the method of any one of Embodiments 66-69, wherein the secondary viscosifier comprises at least one of a linear polysaccharide, and poly(($C_2$-$C_{10}$)alkenylene), wherein the ($C_2$-$C_{10}$)alkenylene is substituted or unsubstituted.

Embodiment 71 provides the method of any one of Embodiments 66-70, wherein the secondary viscosifier comprises at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar, gum ghatti, gum arabic, locust bean gum, derivatized cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 72 provides the method of any one of Embodiments 66-71, wherein the secondary viscosifier comprises poly(vinyl alcohol) homopolymer, poly(vinyl alcohol) copolymer, a crosslinked poly(vinyl alcohol) homopolymer, and a crosslinked poly(vinyl alcohol) copolymer.

Embodiment 73 provides the method of any one of Embodiments 1-72, wherein the composition further comprises a crosslinker comprising at least one of chromium, aluminum, antimony, zirconium, titanium, calcium, boron, iron, silicon, copper, zinc, magnesium, and an ion thereof.

Embodiment 74 provides the method of Embodiment 73, wherein the crosslinker comprises at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 75 provides the method of any one of Embodiments 1-74, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 76 provides a system for performing the method of any one of Embodiments 1-75, comprising:
the composition comprising the viscosifier polymer; and
a subterranean formation having the composition therein.

Embodiment 77 provides the system of Embodiment 76, further comprising
a tubular disposed in the injection wellbore;
a pump configured to pump the composition downhole.

Embodiment 78 provides a method of treating a subterranean formation, the method comprising:
obtaining or providing a composition comprising
a viscosifier polymer wherein the viscosifier polymer comprises repeating units having the structure

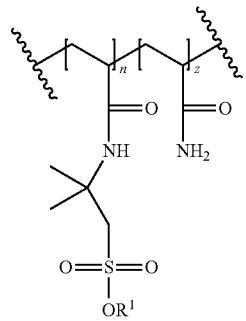

at each occurrence $R^1$ is independently selected from the group consisting of —H and a counterion,
the repeating units are in block, alternate, or random configuration,
the viscosifier polymer has a molecular weight of about 5,000,000 g/mol to about 15,000,000 g/mol, and
n is about 5,000 to about 75,000, and z is about 2,500 to about 170,000;
placing the composition in a subterranean formation downhole via an injection wellbore; and
extracting material comprising petroleum from the subterranean formation downhole via a production wellbore.

Embodiment 79 provides a system comprising:
a composition comprising
a viscosifier polymer having about $Z^1$ mol % of an ethylene repeating unit comprising a —C(O)$NH_2$ group and about $N^1$ mol % of an ethylene repeating unit comprising an —S(O)$_2$O$R^1$ group, wherein
at each occurrence $R^1$ is independently selected from the group consisting of —H and a counterion,
the repeating units are in block, alternate, or random configuration,
$Z^1$ is about 10% to about 90%, and $N^1$ is about 10% to about 90%, and
the viscosifier polymer has a molecular weight of about 5,000,000 g/mol to about 15,000,000 g/mol; and
a subterranean formation comprising the composition therein.

Embodiment 80 provides the system of Embodiment 79, further comprising
a tubular disposed in a wellbore;
a pump configured to pump the composition downhole.
Embodiment 81 provides a composition for enhanced oil recovery, the composition comprising:
a viscosifier polymer having about $Z^1$ mol % of an ethylene repeating unit comprising a —C(O)NH$_2$ group and about $N^1$ mol % of an ethylene repeating unit comprising an —S(O)$_2$OR$^1$ group, wherein
at each occurrence R$^1$ is independently selected from the group consisting of —H and a counterion,
the repeating units are in block, alternate, or random configuration,
$Z^1$ is about 10% to about 90%, and $N^1$ is about 10% to about 90%, and
the viscosifier polymer has a molecular weight of about 5,000,000 g/mol to about 15,000,000 g/mol.
Embodiment 82 provides a method of preparing a composition for enhanced oil recovery, the method comprising:
forming a composition comprising
a viscosifier polymer having about $Z^1$ mol % of an ethylene repeating unit comprising a —C(O)NH$_2$ group and about $N^1$ mol % of an ethylene repeating unit comprising an —S(O)$_2$OR$^1$ group, wherein
at each occurrence R$^1$ is independently selected from the group consisting of —H and a counterion,
the repeating units are in block, alternate, or random configuration,
$Z^1$ is about 10% to about 90%, and $N^1$ is about 10% to about 90%, and
the viscosifier polymer has a molecular weight of about 5,000,000 g/mol to about 15,000,000 g/mol.
Embodiment 83 provides the composition, apparatus, method, or system of any one or any combination of Embodiments 1-82 optionally configured such that all elements or options recited are available to use or select from.

What is claimed is:
1. A method of enhanced oil recovery, the method comprising:
placing in a subterranean formation via an injection wellbore a crosslinked gel, wherein the crosslinked gel comprises:
a viscosifier polymer, wherein the viscosifier polymer comprises an ethylene repeating unit comprising a —C(O)NH$_2$ group and an ethylene repeating unit comprising an —S(O)$_2$OR$^1$ group, wherein ethylene repeating units having the structure:

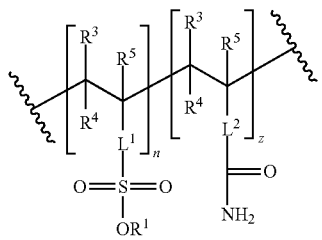

wherein at each occurrence R$^1$ is independently selected from the group consisting of —H and a counterion, at each occurrence R$^3$, R$^4$, and R$^5$ are independently selected from the group consisting of —H, —CH$_3$, —CH$_2$CH$_3$, at each occurrence L$^1$ and L$^2$ are independently selected from the group consisting of a substituted or unsubstituted C$_1$-C$_{40}$ hydrocarbyl interrupted or terminated with 0, 1, 2, or 3 of at least one of —NR$^3$—, —S—, and —O—, wherein n is about 5,000 to about 75,000, and z is about 2,500 to about 170,000 and
the repeating units are in block, alternate, or random configuration, wherein the repeating unit is independently in the orientation shown or in the opposite orientation
a secondary viscosifier, and
a crosslinker, wherein the crosslinker comprises at least one of chromium, aluminum, antimony, zirconium, titanium, calcium, boron, iron, silicon, copper, zinc, magnesium, and an ion thereof; and
extracting material comprising petroleum from the subterranean formation downhole via a production wellbore.
2. The method of claim 1, wherein the method is a method of at least one of chemical flooding, polymer flooding, alkaline polymer flooding, alkali-polymer-surfactant enhanced oil recovery, micellar polymer flooding, and surfactant polymer flooding.
3. The method of claim 1, wherein the placing of the composition in the subterranean formation downhole comprises placing the composition in a producing zone downhole, and wherein the extracting of the material comprising petroleum from the subterranean formation downhole comprises extracting of the material from the producing zone.
4. The method of claim 1, wherein about 0.001 wt % to about 100 wt % of the composition is the viscosifier polymer.
5. The method of claim 1, wherein the viscosifier polymer is sufficient such that, as compared to the viscosity provided at a concentration in water at about 25° C. at standard pressure and 100 s$^{-1}$, the viscosity provided at the same concentration in water at about 100° C. at standard pressure and 100 s$^{-1}$ is no more than about 30% to about 50% lower.
6. The method of claim 1, wherein the viscosifier polymer has about $Z^1$ mol % of the ethylene repeating unit comprising the —C(O)NH$_2$ group and has about $N^1$ mol % of the ethylene repeating unit comprising the —S(O)$_2$R$^1$ group, wherein $Z^1$ is about 10% to about 90%, and $N^1$ is about 10% to about 90%.
7. The method of claim 6, wherein $Z^1$+$N^1$ is about 100%.
8. The method of claim 1, wherein the viscosifier polymer has a molecular weight of about 5,000,000 g/mol to about 15,000,000 g/mol.
9. The method of claim 1, wherein L$^1$ is —C(O)—NH—C(CH$_3$)$_2$—CH$_2$—.
10. The method of claim 1, wherein at each occurrence R$^3$, R$^4$, and R$^5$ are each —H.
11. The method of claim 1, wherein at each occurrence —R$^1$ is independently selected from the group consisting of —H, Na$^+$, K$^+$, Li$^+$, NH$_4^+$, Zn$^+$, Zn$^{2+}$, Al$^{3+}$, and Mg$^{2+}$.
12. The method of claim 1, wherein n is 20,000 to about 45,000.
13. The method of claim 1, wherein z is about 13,500 to about 65,000.
14. The method of claim 1, wherein the composition further comprises a surfactant.
15. The method of claim 1, wherein at least one of L$^1$ or L$^2$ is the substituted C$_1$-C$_{40}$ hydrocarbyl.
16. The method of claim 1, wherein at least one of L$^1$ or L$^2$ is the unsubstituted C$_1$-C$_{40}$ hydrocarbyl.

17. The method of claim 1, wherein at least one of $L^1$ or $L^2$ is the substituted or unsubstituted $C_1$-$C_{40}$ hydrocarbyl interrupted with 0, 1, 2, or 3 of at least one of —$NR^3$, —S—, and —O.

18. The method of claim 1, wherein at least one of $L^1$ or $L^2$ is the substituted or unsubstituted $C_1$-$C_{40}$ hydrocarbyl terminated with 0, 1, 2, or 3 of at least one of —$NR^3$—, —S—, and —O.

\* \* \* \* \*